United States Patent [19]
Reddig

[11] Patent Number: 5,473,399
[45] Date of Patent: Dec. 5, 1995

[54] EXPANDABLE FILM CARTRIDGE MAGAZINE AND METHOD OF DELIVERING FILM CARTRIDGES IN A PHOTOFINISHING PROCESS

[75] Inventor: Alan G. Reddig, Rochester, N.Y.

[73] Assignee: Eastman Kodak Company, Rochester, N.Y.

[21] Appl. No.: 324,955

[22] Filed: Oct. 18, 1994

[51] Int. Cl.$^6$ ............................................. G03B 17/26
[52] U.S. Cl. ........................... 354/275; 354/319; 206/391
[58] Field of Search ........................... 354/275, 319–323, 354/354; 352/78 R, 78 C, 103; 221/69; 206/391

[56] References Cited

U.S. PATENT DOCUMENTS

| | | | |
|---|---|---|---|
| 3,231,685 | 1/1966 | Kuehnle | 352/103 X |
| 3,307,021 | 2/1967 | Holland | 235/61.11 E |
| 5,347,338 | 9/1994 | Weibel | 354/354 |

*Primary Examiner*—D. Rutledge
*Attorney, Agent, or Firm*—Frank Pincelli

[57] ABSTRACT

An expandable magazine and a method of delivering film cartridges to a photofinishing work station using said magazine. The magazine has at least one support member forming at least one loop. The support member has a front end, a rear end, and releasable member for connecting the front end to the rear end of the support member together or to an adjacent support member. The support member also has an outer peripheral side and at least one pocket for holding and retaining a film cartridge. The pocket has an access opening facing the outer periphery side. A drive mechanism is provided for engaging the outer peripheral side of the magazine so that each of the pockets are presented at a photofinishing delivery station.

21 Claims, 5 Drawing Sheets

5,473,399

EXPANDABLE FILM CARTRIDGE MAGAZINE AND METHOD OF DELIVERING FILM CARTRIDGES IN A PHOTOFINISHING PROCESS

FIELD OF THE INVENTION

The present invention is directed to a magazine for holding film cartridges containing photographic film and to a method of delivering film to photofinishing equipment used in the photofinishing process.

BACKGROUND OF THE INVENTION

In the photofinishing process, film cartridges are typically grouped into batches for handling in the photofinishing lab. In copending commonly assigned application U.S. Ser. No. 08/242,472, entitled FILM CARTRIDGE MAGAZINE of Robert J. Blackman, filed on May 12, 1994, there is suggested use of magazines for containing and delivering film cartridges to various photofinishing stations. The cartridge magazine is designed to be used with the various processing equipment. Typically, the equipment is provided with an interface mechanism which will sequentially remove the film cartridges from the magazine and route them to appropriate photofinishing activity that particular photofinishing machine performs, and then return the film cartridge sequentially to the same or another magazine. It is important that the magazine hold the cartridge securely with the magazine and that they are maintained in sequence.

Photofinishing generally involves processing batches of cartridges. The batch size will vary for a number of reasons. In some situations, a small batch could contain as few as 20 cartridges and a large batch could contain in excess of 120 cartridges. Because of the cost to tool, manufacture, and inventory several sizes of magazines, it is desirable that one magazine function across a wide range of batch sizes. However, large batches can result in undesirable magazines that are either too large or heavy. Thus, it is extremely desirable for magazines to have the ability to be expandable in terms of the number of cartridges it will hold, while still maintaining minimal size and configuration.

In addition to linear-type magazines, there has been suggested circular-type magazines, for example, as described in U.S. Pat. No. 5,347,338. Circular-type magazines offer distinct advantages over linear- or matrix-type magazines in that its motion and motion control in one axis (rotary) is only required. However, typical circular magazines can not be expanded to accommodate more cartridges than the number for which it was designed.

Another problem with prior art-type magazines is that at some point the magazine must be loaded and unloaded, thus requiring an interruption of the processing of the film.

The present invention provides a easily expandable film cartridge magazine which can handle small batch sizes to very large sizes. The magazine is also simple and easy to align with the photofinishing equipment and allows for the continuous operation of the photofinishing process.

SUMMARY OF THE INVENTION

In one aspect of the invention there is provided an expandable magazine having at least one support member forming at least one loop. The support member has a front end, a rear end, and releasable member for connecting the front end to the rear end of the support member together or to an adjacent support member. The support member also has an outer peripheral side and at least one pocket for holding and retaining a film cartridge. The pocket has an access opening facing the outer periphery side.

In another aspect of the present invention there is provided a method of delivering film cartridges to a photofinishing workstation designed to receive a magazine having at least one support member forming at least one loop. The support member has a front end, a rear end, and releasable member for connecting the front end to the rear end of the support member or adjacent support member. The support member has an outer peripheral side and at least one pocket for holding and retaining a film cartridge. The pocket has an access opening facing the outer periphery side. A drive mechanism is provided for engaging the outer peripheral side. The method comprising the steps of activating said drive mechanism so that the pockets are presented at a photofinishing delivery station.

DETAILED DESCRIPTION OF THE INVENTION

Figure 1:
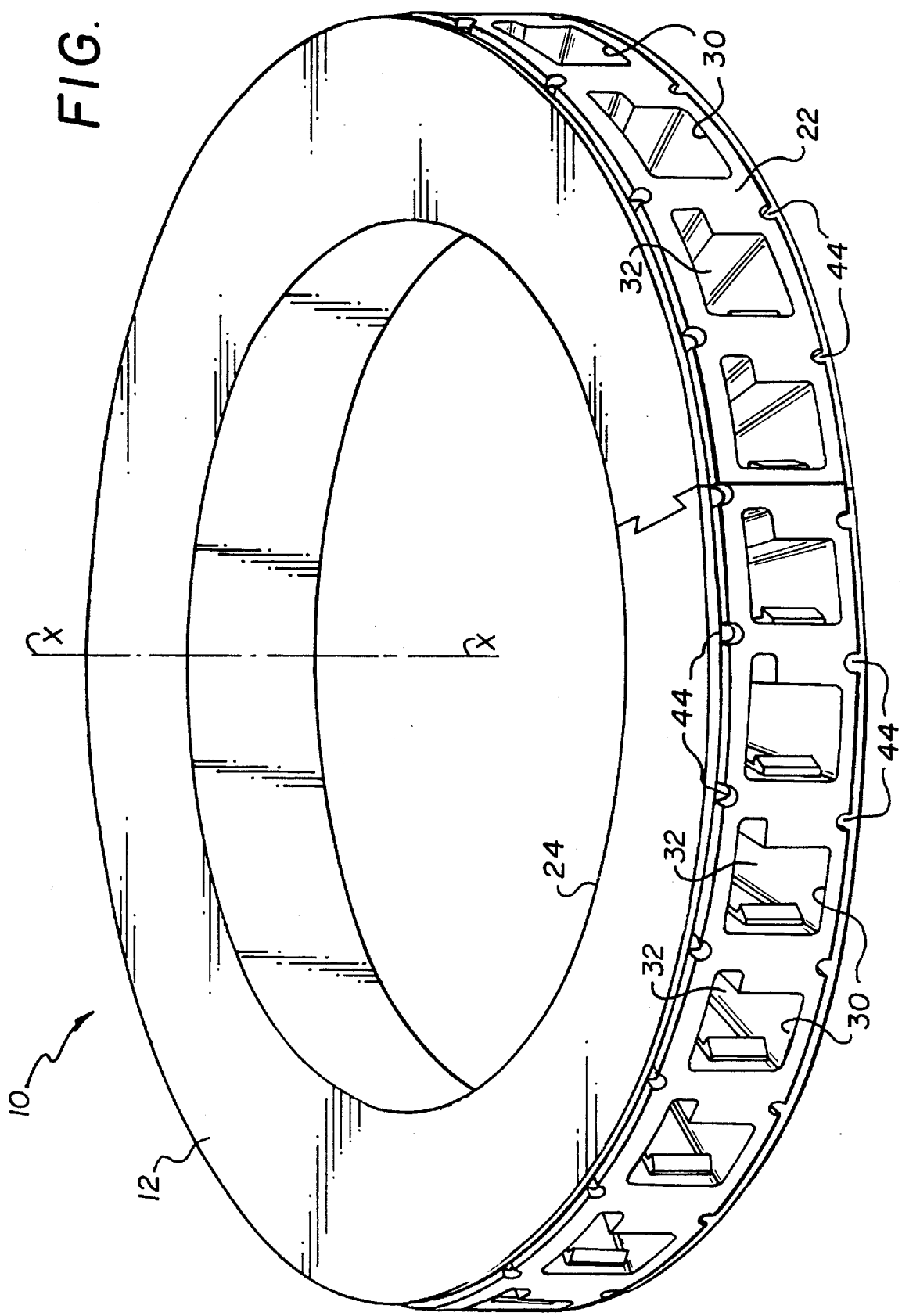
FIG. 1 is a magazine made in accordance with the present invention comprising of a single support member in the operational position.
Figure 2:
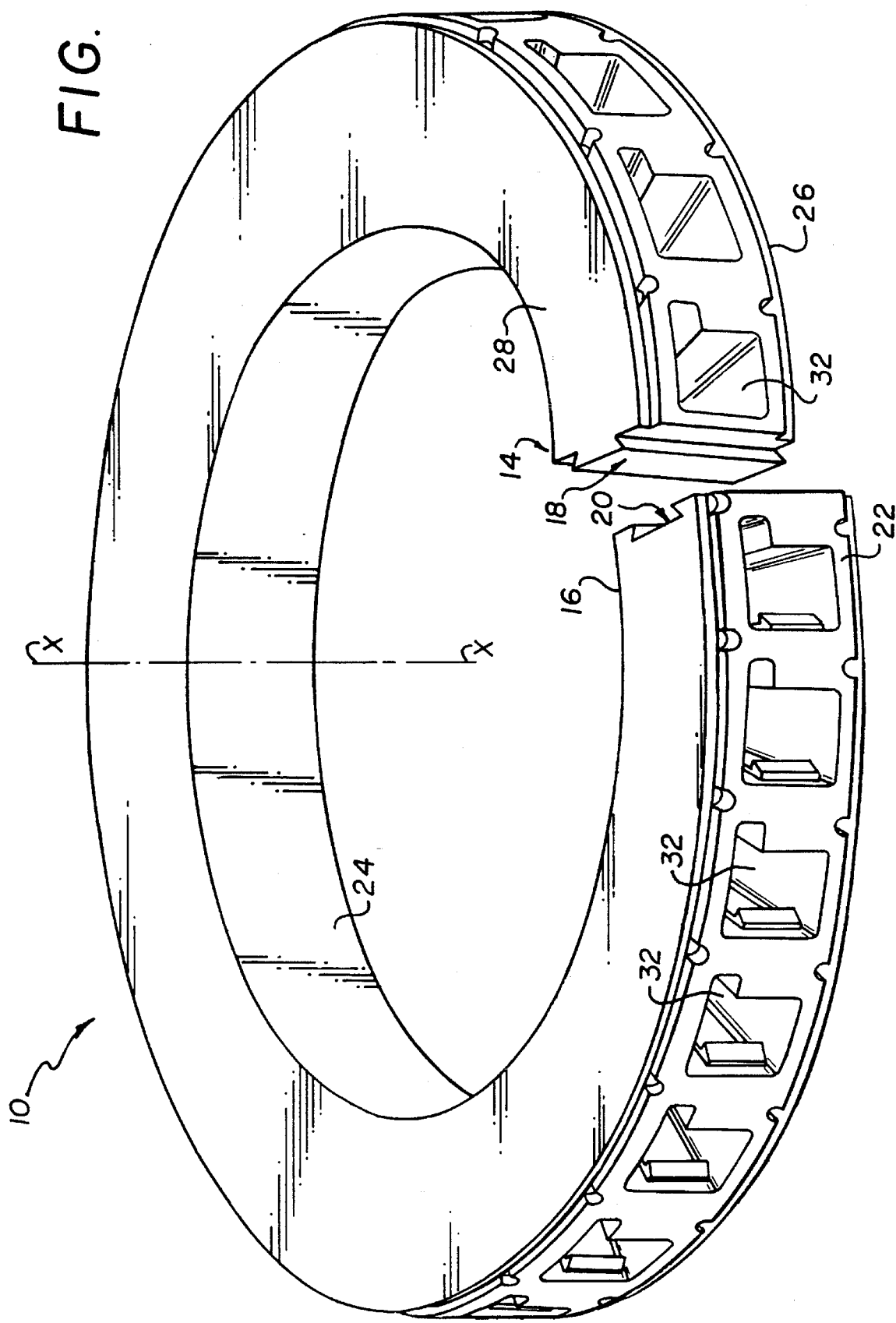
FIG. 2 is a view similar to FIG. 1 illustrating the support member in the disengaged position.

Referring the FIGS. 1 and 2, there is illustrated an expandable magazine 10. In the particular embodiment illustrated, the expandable magazine 10 comprises a single support member 12. The support member 12 has a forward end 14 and a rear end 16 which are designed to be releasably connected to each other. Alternatively, the rear end may be connected to the forward end of an adjacent support member 12. Preferably, the support member is made of a material which allows the ends 14,16 to be moved axially for allowing engagement of the ends 14,16. In the embodiment illustrated, member 12 is made of a plastic material, for example, polycarbonate. In the embodiment illustrated, the releasably connecting means provided at the forward and rear ends comprises a projection 18 formed in the forward end 14 which is designed to slide into a correspondingly-shaped recess 20 formed in the rear end 16. It is, of course, understood that any other type of releasably connecting means may be provided for connecting of the rear end 16 to the forward end 14. For example, but not by way of limitation, snaps, clips, and other male/female connections.

Figure 3:
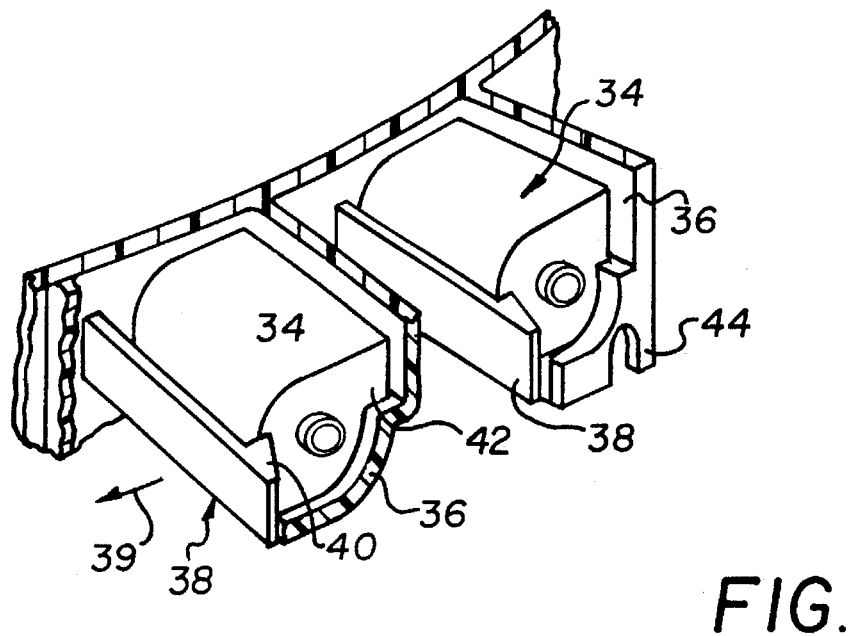
FIG. 3 is an enlarged partial broken away view of a portion of one of the support members illustrating in detail the pockets used to hold and retain the film cartridge magazine.

As can be seen by reference to FIG. 1, when the forward end 14 and the rear end 16 are connected, a closed continuous loop is provided (that is, a loop which extends 360°). In the preferred embodiment illustrated, the support member 12 comprises a generally tubular member having a generally circular outer configuration. The support member 12 has an outer peripheral side 22 and inner peripheral side 24 and a pair of axial sides 26,28. The support member 12 further includes a plurality of pockets 30, each pocket 30 is designed to receive a film cartridge 34 containing a strip of photographic film. In the particular embodiment illustrated, there is provided sixteen pockets 30, each having a configuration designed to receive a standard 35 mm film cartridge. However, any desired number of pockets may be provided and configuration of pockets 30 may be varied to receive any desired film shape or size cartridge. The pocket 30 has an access opening 32 which preferably faces outer peripheral side 22 whereby the film cartridge 34 may be inserted into or removed from the pocket 30. Referring to FIG. 3, there is illustrated in greater detail, the construction of a pair of adjacent pockets 30 formed in support member 12. In particular, each pocket 30 includes an outer peripheral wall 36 which is configured so as to closely conform to the outer configuration of the film cartridge 34. A flexible retaining hook member 38 is provided which can be flexed in the outward direction as indicated by arrow 39 when the film cartridge 34 is inserted into the pocket 30 and which will be deflected by an appropriate mechanism (not shown) when the film cartridge 34 is desired to be removed from the pocket 30. The retaining hook member 38 is configured and made of an appropriate material so that it may be deflected an appropriate distance for allowing the cartridge 34 to be easily inserted or removed therefrom. The retaining hook member 38 includes a retaining section 40 which will engage the end 42 of a film cartridge 34 placed within the pocket 30. When the retaining hook member 38 is moved in the direction indicated by arrow 39, the retaining section will be moved out of the path of movement of the film cartridge 34, thus allowing insertion or removal.

The outer peripheral side 22 of member 12 is provided with a plurality of drive notches 44 which can be used for driving the magazine 10 about its axis of rotation 46 at the photofinishing equipment which it is placed.

Figure 4:
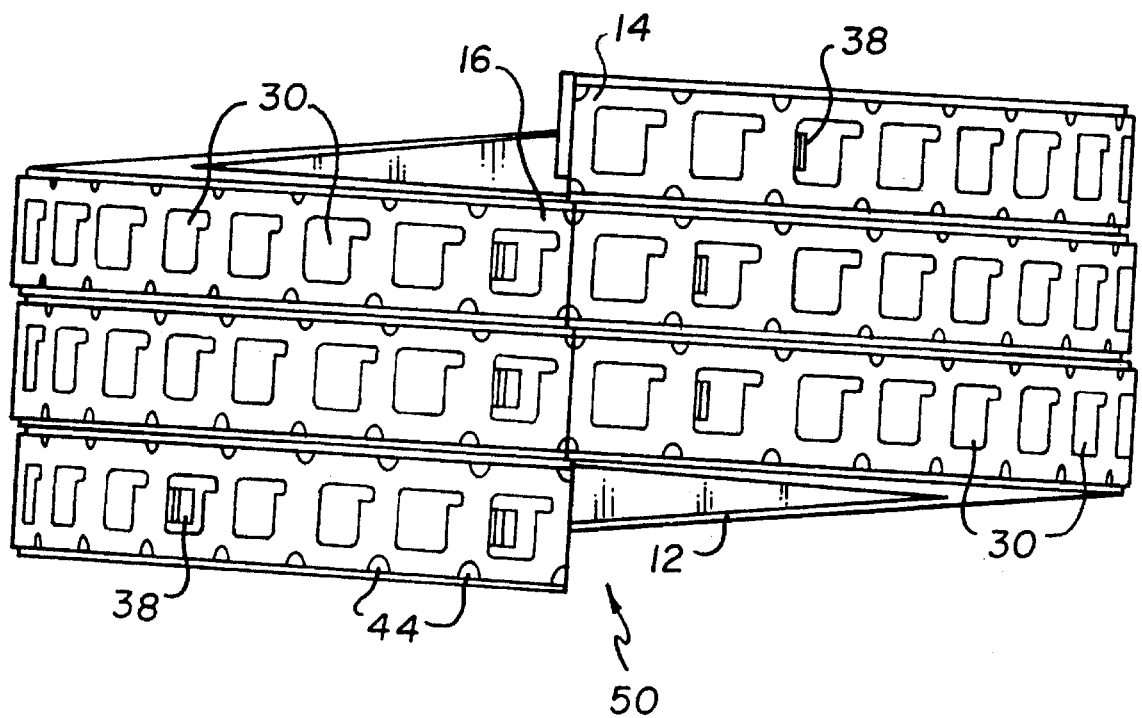
FIG. 4 is a front elevational view of an expandable magazine made in accordance with the present invention having a plurality of support members connected together.

Referring to FIG. 4, there is illustrated a modified expandable magazine 50 which comprises a plurality of support members 12. Magazine 50 is similar to magazine 10, like numerals referring to like parts. In particular, the rear end 16 of a first support member 12 is connected to a forward end 14 of the adjacent support member 12 and rear end 16 of the second support member 12 is connected to the forward end 14 of a third support member 12. Thus, the magazine 50 comprises three support members joined together, each support member containing approximately 16 pockets. Thus, the magazine 50 can accommodate approximately ninety-six cartridges 34. However, it is understood that the expandable magazine may be comprised of any desired number of support members 12 so as to provide the appropriate number of cartridges for that particular batch. In this embodiment, the members 12 are configured so that a generally helical pattern is formed by the member 12 such that the sides 26,28 of adjacent members tough or are closely adjacent each other.

Figure 5:
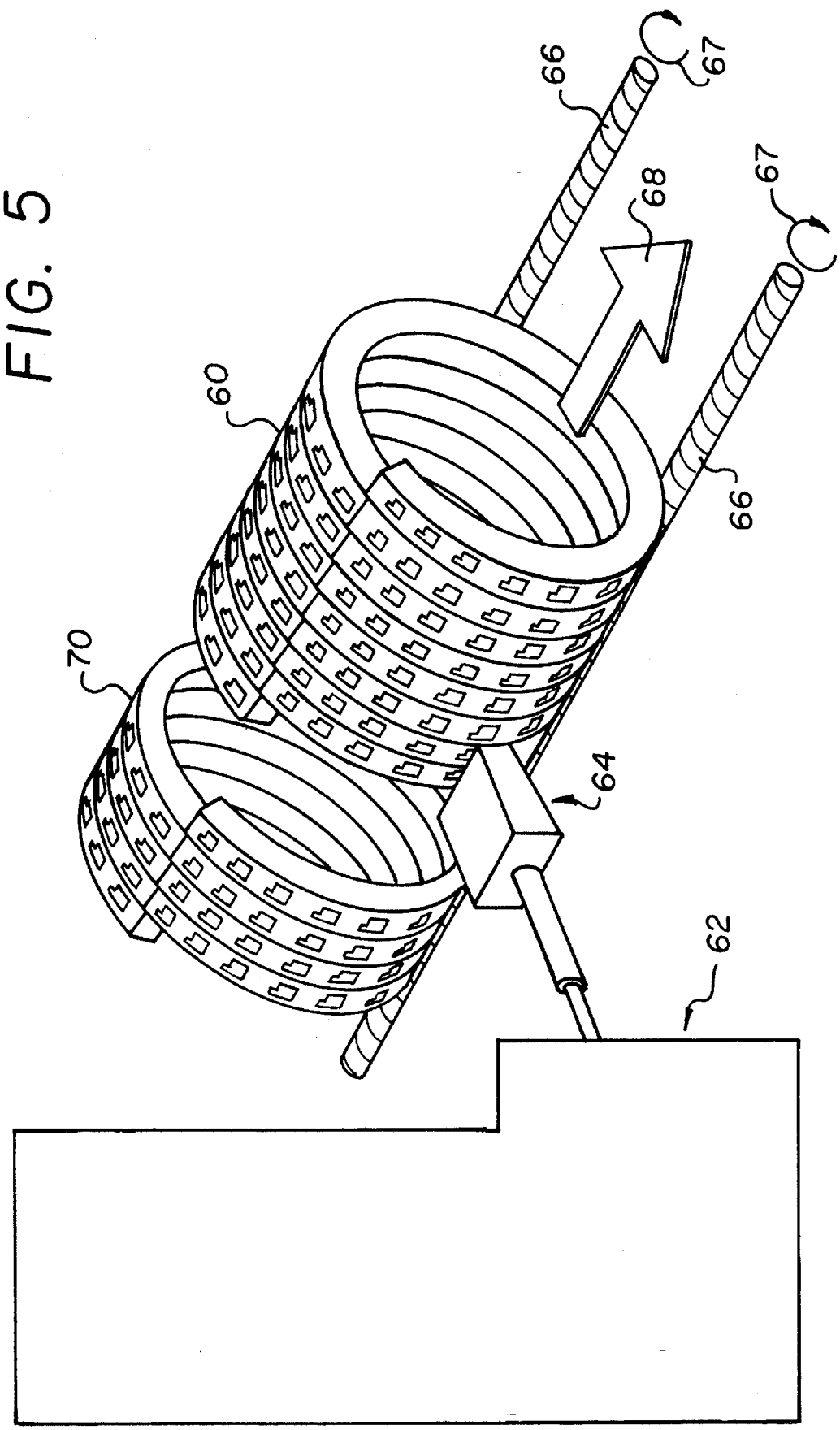
FIG. 5 is perspective view of an expandable magazine comprising a plurality of support members placed on a drive system in a photofinishing process.

Referring to FIG. 5, there is illustrated a magazine 60 having four support members 12 placed on a drive mechanism adjacent a piece of photofinishing equipment 62, which includes a mechanism 64 for removing and inserting film cartridges from the magazine. As can be seen, the delivery station includes a pair of drive shafts 66 having means for engaging the drive notches 44 in the magazine 10. Thus, by rotating the drive shaft 66 in the direction as indicated by arrow 67, the next adjacent pocket will be provided at mechanism 64 for removing and/or returning the cartridge to the pocket 30 of magazine 50. As the drive shafts 66 are rotated, the magazine will move in the direction indicated by arrow 68. As illustrated in FIG. 5, a magazine 70 containing a plurality of support members 12 of a second batch size is provided directly behind magazine 60. Thus, when the last film cartridge is removed or replaced in magazine 60, the drive shaft 66 can be rotated so as to present the first pocket of magazine 70 to the delivering mechanism 64. Thereby, providing a substantially continuous process at the workstation.

If desired, individual support members 12 may be removed from the leading end of magazine 60 while at the delivery station, while at the same time individual support members may be added to the trailing support member such that a continuous process may be provided of detaching individual support members and adding support members so that the process is never interrupted at the photofinishing station, thus providing a totally continuous delivery at the workstation.

Figure 6:
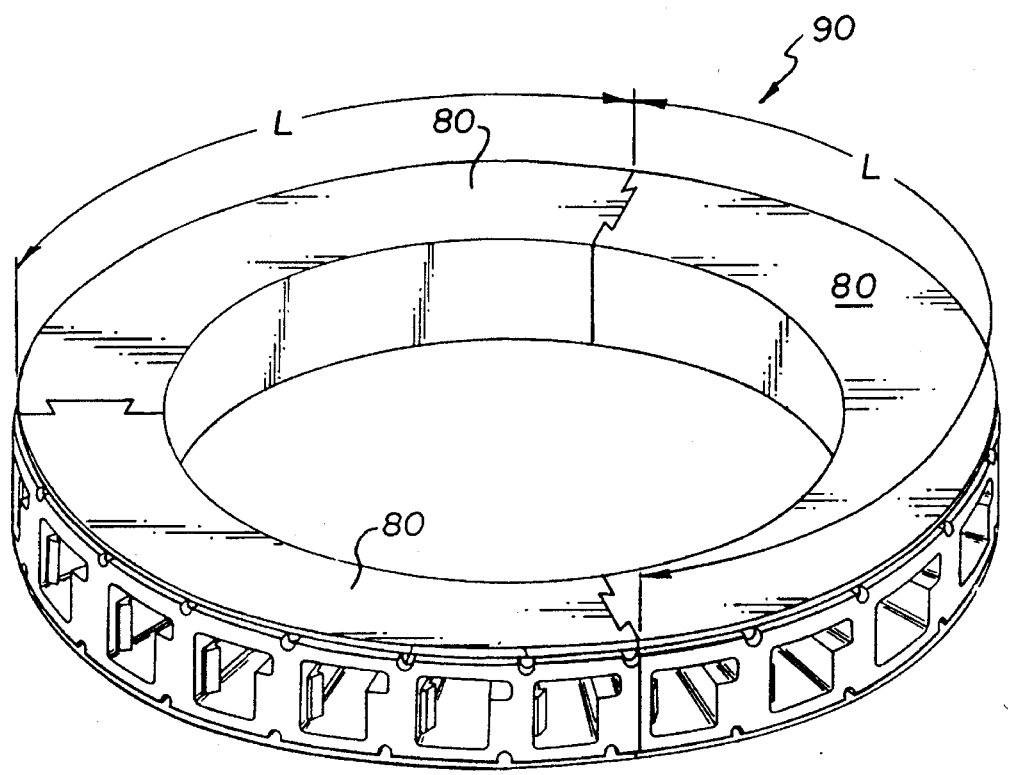
FIG. 6 is a perspective view of a modified expandable magazine made in accordance with the present invention.

In the preferred embodiment illustrated, the support member 12 forms one loop of the expandable magazine such that each support member provides another full loop. However, the present invention is not so limited. Referring to FIG. 6, there is illustrated a expandable magazine 90 comprising a plurality of wherein the support members 80 each have an arcuate length L, which is less than a full loop. The expandable magazine 90 will comprise at least the minimum number of support members 80 necessary to complete at least one loop. Thereafter, any additional number of support members 80 may be provided so that the desired number of cartridges for that batch can be more precisely controlled to fit the needs of the photofinishing equipment.

Figure 7:
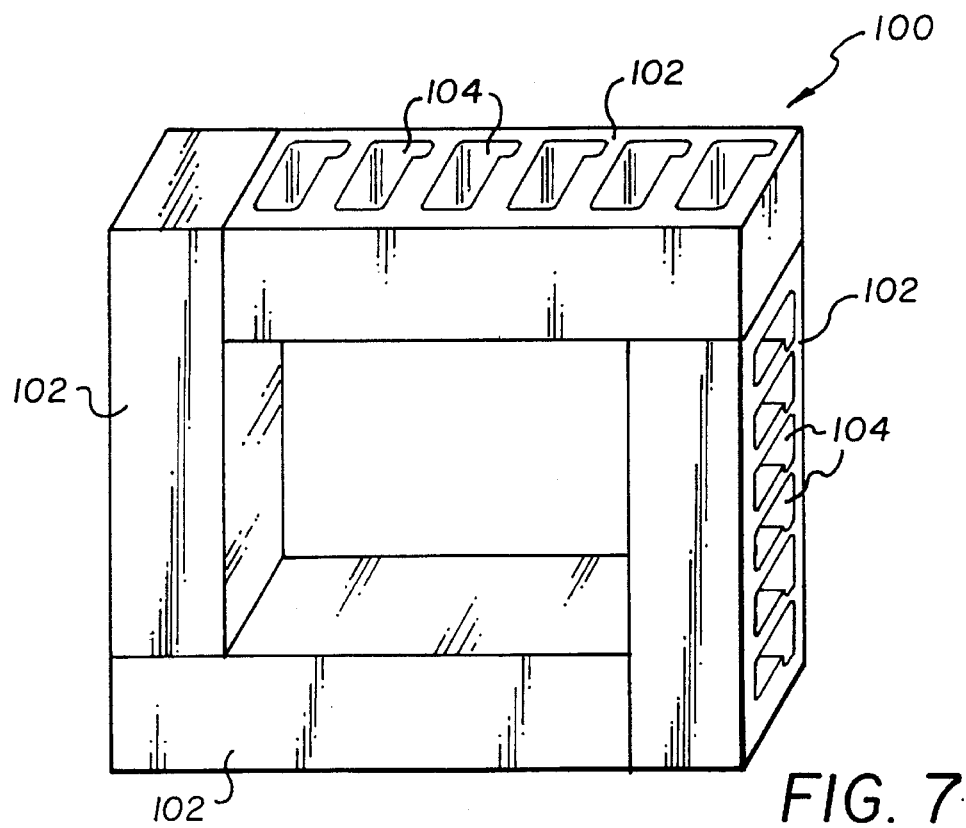
FIG. 7 is a perspective view of another modified magazine made in accordance with the present invention.

In the preferred embodiment, the support members are shown so as to provide a substantially circular outer configuration which assists in providing a simple mechanism for driving of the magazine at the workstation. However, if so desired, the expandable magazine may comprise of another configuration having alternate configured support members. Referring to FIG. 7, there is illustrated an expandable magazine 100 comprising a plurality of support members 102 which form at least one loop structure having a substantially rectangular configuration. In the embodiment illustrated, a single loop is formed by four individual linear support members 102 which form a square loop. Each support member is provided with a plurality of pockets 104 which are similar in shape and configuration to pockets 30 as previously described. In this configuration, alternate mechanisms must be used for moving a rotating of the magazine at the workstation. Additionally, the mechanism 64 used to remove or insert the cartridges 34 must be moved relative to the magazine in some manner so that each of the pockets can be individually accessed. For example, an appropriate mechanism can be used to lift the magazine 100 and rotate at 90° so that each successive side will completely face the delivery mechanism 64, whereby the mechanism 64 will be moved to engage each of the pockets 30. It is, of course, understood that any desired mechanism may be used for locating of the individual pockets with respect to the mechanism 64.

It is to be understood that various other modifications or changes may be made without departing from the scope of the present invention. The present invention being limited by the following claims.

Parts List:

10,90,100 . . . expandable magazines
12,80,102 . . . support members
14 . . . forward end
16 . . . rear end
18 . . . projection
20 . . . recess
22 . . . outer peripheral side
24 . . . inner peripheral side
26,28 . . . axial sides
30,104 . . . pockets
32 . . . access opening
34 . . . film cartridge
36 . . . peripheral wall
38 . . . retaining hook member
39,67,68 . . . arrows
40 . . . retaining section
42 . . . end
44 . . . drive notches
46 . . . axis of rotation
50 . . . modified expandable magazine
60,70 . . . magazine
62 . . . photofinishing equipment
64 . . . mechanism
66 . . . drive shaft

I claim:

1. An expandable magazine having at least one support member forming at least one loop, said support member having a front end, a rear end, and releasable means for connecting the front end to the rear end of said support member together or to an adjacent support member, said support member having an outer peripheral side and at least one pocket for holding and retaining a film cartridge, said at least pocket having an access opening facing the outer periphery side.

2. An expandable magazine according to claim 1, wherein said outer periphery side includes means for engaging a drive mechanism.

3. An expandable magazine according to claim 2, wherein said means for engaging a drive mechanism includes a plurality of drive notches disposed on the outer peripheral surface along the length of said support members.

4. An expandable magazine according to claim 1, wherein said magazine includes at least three support members.

5. An expandable magazine according to claim 1, wherein each support member extends approximately 360° so as to form a single loop.

6. An expandable magazine according to claim 1, wherein said support member is made out of a flexible plastic material.

7. An expandable magazine according to claim 6, wherein said support member is made out of a polycarbonate plastic material.

8. An expandable magazine according to claim 1, wherein said loop is has a generally helical configuration.

9. An expandable magazine according to claim 1, wherein said at least one support member comprises a generally tubular cross-sectional rectangular configuration.

10. An expandable magazine according to claim 1, wherein said pocket includes means for retaining a film cartridge magazine therein.

11. An expandable magazine according to claim 10, wherein said means comprises a flexible retaining hook having a retaining surface designed to engage the outer end of a film cartridge placed in the pocket.

12. An expandable magazine according to claim 1, wherein said magazine has a generally circular outer configuration.

13. An expandable magazine according to claim 1 wherein a plurality of support members are provided.

14. An expandable magazine according to claim 13 three or more support members are provided.

15. An expandable magazine according to claim 13 wherein 7 support members are provided.

16. An expandable magazine according to claim 1, wherein said loop has a generally rectangular configuration.

17. An expandable magazine according to claim 1, wherein said loop has a generally square configuration.

18. An expandable magazine according to claim 17, wherein said loop is formed from a plurality of said support members and each of said support members have a generally linear configuration.

19. A method of delivering film cartridges to a photofinishing workstation which includes providing a magazine having at least one support member forming at least one loop, said support member having a front end, a rear end, and releasable means for connecting the front end to the rear end of said support member or adjacent support member, said support member having an outer peripheral side and at least one pocket for holding and retaining a film cartridge, said at least one pocket having an access opening facing the outer periphery side; and providing a drive mechanism for engaging the outer peripheral side comprising the steps of:

activating said drive mechanism so that said pockets are presented at a photofinishing delivery station.

20. A method of delivering film cartridges to a photofinishing workstation which includes providing an expandable magazine having at plurality of support members forming at least one loop, each of said support member having a front end, a rear end, and releasable means for connecting the front end to the rear end of the adjacent support member, said support member having at least one pocket for holding and retaining a film cartridge, said at least one pocket having an access; and providing a drive mechanism for moving said expandable magazine by a photofinishing workstation comprising the steps of:

substantially continuously providing a pocket at said photofinishing workstation.

21. The method according to claim 20 wherein a support member is added to the trailing end of the magazine at the work station and a support member is removed from the forward end of the expandable magazine at the work station.

* * * * *